H. J. WHITE.
Dried Fruit Looseners.
No. 166,171. Patented July 27, 1875.
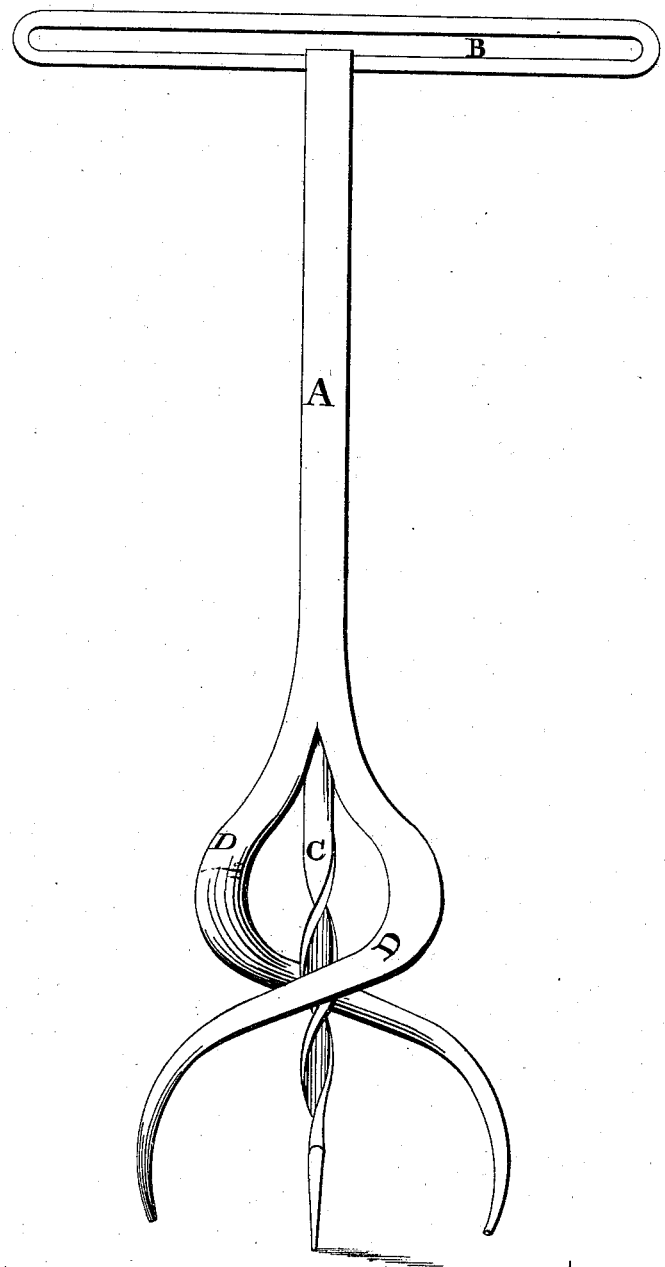
WITNESSES.
F. B. Townsend
Noah B. Smith
INVENTOR.
H. J. White
By his atty
R. D. O. Smith

UNITED STATES PATENT OFFICE.

HENRY J. WHITE, OF GREEN BAY, WISCONSIN, ASSIGNOR TO JAMES V. HIDDLESON, OF CHICAGO, ILLINOIS.

IMPROVEMENT IN DRIED-FRUIT LOOSENERS.

Specification forming part of Letters Patent No. 166,171, dated July 27, 1875; application filed May 20, 1875.

*To all whom it may concern:*

Be it known that I, HENRY J. WHITE, of Green Bay, in the State of Wisconsin, have invented an Improved Fruit-Auger, of which the following is a specification:

It is well known among grocers that dried-fruit, sugar, &c., become very firmly compacted in the barrels, boxes, &c., in which they are placed for storage or transportation, and that considerable trouble and labor is required to loosen them up prior to selling at retail.

This invention relates to an improvement in fruit-augers, whereby the action of the same is rendered more controllable and satisfactory; and it consists of a shaft provided at one end with a cross-piece or handle, and at the other with a central guide-point and one or more spiral prongs, to penetrate and loosen up the dried fruit or other substance into which it is forced.

That others may fully understand my improvement, I will particularly describe it, having reference to the annexed drawing, wherein the device in question is shown in elevation.

A is the metallic central shaft, provided at its upper end with a cross-piece or handle, B, which may be either wooden or metallic. At the lower end the shaft A terminates in a central point or guide, C, and one or more prongs, D D, are attached to the base of the shaft A at the point of junction with the guide-point C. These prongs D are bent outward and then downward in a cylindrical spiral line, terminating about or a little above the terminal plane of the central point.

In operation this apparatus is handled like an auger. The point C is rested against the surface of the compacted mass of dried fruit, and the implement is revolved. The point guides the prongs as they penetrate, and prevents any slipping or sidewise movement as they penetrate. As the prongs D penetrate the dried fruit is loosened up in the vicinity of the said prongs, and when the penetration has extended to some considerable depth, by forcibly withdrawing the auger, the fruit may be loosened for a considerable distance on all sides.

Having described my invention, what I claim as new is—

A fruit-auger composed of the stock A, with a cross-piece or handle at one end, and the central guide-point C and spiral prongs D at the other, substantially as set forth.

In evidence that I claim the above as my invention, witness my hand this 6th day of April, 1875.

H. J. WHITE.

Witnesses:
JOHN H. CASE,
C. H. KIES.